United States Patent [19]

Guenther

[11] Patent Number: 4,810,514
[45] Date of Patent: Mar. 7, 1989

[54] METHOD OF REALIGNING FIBERS IN MANUFACTURING MEAT PRODUCTS

[75] Inventor: John J. Guenther, Stillwater, Okla.

[73] Assignee: Board of Regents Acting for and on Behalf of Oklahoma State University, Stillwater, Okla.

[21] Appl. No.: 921,547

[22] Filed: Oct. 22, 1986

[51] Int. Cl.$^4$ ................................................ A23L 1/31
[52] U.S. Cl. ..................................... 426/513; 426/518; 426/641
[58] Field of Search ................. 426/518, 513, 641, 480

[56] References Cited

U.S. PATENT DOCUMENTS

4,057,650  11/1977  Keszler ................................ 426/513
4,224,349   9/1980  Gooch et al. ......................... 426/281

Primary Examiner—George Yeung
Attorney, Agent, or Firm—Robert B. Stevenson

[57] ABSTRACT

A method of manufacturing a structured meat product that simulates the texture and appearance of the more expensive quality cut by starting from a lower quality primal cut or wholesale cut. The method comprises the steps of separating the individual muscles and adjacent muscle groups of the wholesale cuts; denuding the muscles (e.g., removal of epimysial or perimysial connective tissue and the like); optionally adding binders or additives (e.g., $NaCl/Na_5P_3O_{10}$; $KCl/MgCl_2/Na_5P_3O_{10}$; and $KCl/CaCl_2/Na_5P_3O_{10}$ solutions); orienting the separated muscles such that the long fiber direction of each muscle and muscle groups are colinear; passing the fiber aligned muscles and muscle groups through a plurality of reciprocating cutting blades (preferably cutting parallel to the fiber alignment direction); compressing and shaping the cut fiber muscles into a desired cross-sectional form; and slicing the compressed, shaped fiber aligned muscles into individual servings by cutting across the fiber alignment direction. Such a method is capable of structuring chuck into a steak-like product.

23 Claims, 2 Drawing Sheets

METHOD OF REALIGNING FIBERS IN MANUFACTURING MEAT PRODUCTS

BACKGROUND OF THE INVENTION

1. Field of the Invention

This invention relates to a method of manufacturing a structured meat product. More specifically, the invention relates to a method of separating lower quality cuts of meat into individual muscles and muscle groups adn then treating, including selectively removing fats and connective tissues, and reassembling the individual muscles and muscle groups to produce a fiber realigned structured meat product that simulates high quality cuts of meat with improved nutritional value.

2. Description of the Prior Art

It is generally known and accepted that most musculature or meat is nutritionally good for the human, but because of such things as tough connective tissue and the like, certain cuts of meat will generally be far superior in terms of texture and general ease of mastication and enhojment when consumed. Thus, various method of cutting, processing, treating, preparing and cooking of meat have long been practiced in the culinary arts. It is common practice to selectively choose a specific cut of meat for a specific end use that incorporates various tenerizing additives, steps and processes on what has come to be recognized as the lower quality cuts, while reserving the higher quality more tender cuts for other more exclusive dishes. Consequently, the market place for meat is structured or tiered into the more expensive (usually the more tender) higher quality cuts and the more economical lower quality cuts. This price structuring in turn has created a major financial incentive to explore ways of converting lower quality meats into products that can commercially command a higher market price reminiscent of the higher quality products. Thus, for example, if one could economically convert a chuck roast into a steak, the net economic effect on the beef industry as a whole would be extremely significant and financially rewarding. As such, contemporary efforts have been directed towards what has now become known as structured meat products. Generally, these structured meat products (whether animal, fowl or fish) involve destroying or drastically altering the muscle and/or connective tissue and then reassembling the meat to restore the texture. However, such structured meat products up to the present have not been able to simulate the texture and eating quality and/or sensation of the more expensive cuts of meat. The present invention is viewed as a process that, at least in part, allows certain lower quality cuts of meat to approach the final texture of the higher price cuts.

SUMMARY OF THE INVENTION

In view of the problems associated with the prior art structured meat products and in particular, the inability of such processes to preserve and/or create the fiber texture associated with an expensive beef steak when using a lower quality cut of beef, the present invention provides a method of manufacturing a structured meat product that preserves any arbitrary degree of connective tissue between aligned fibers of the meat as well as any degree of severing of the aligned fibers after the selective removal of any amount of fat and/or deleterious connective tissue between muscle groups. In the broadest sense, this is achieved by separating the individual muscles and/or adjacent muscle groups of a lower quality cut of meat and then selectively removing the external fat and/or deleterious connective tissue between muscle groups before structuring the meat. The present invention further provides for selective orientation of the muscles and muscle groups into a fiber aligned composite which can then be selectively tenderized by cutting between and/or through aligned fibers before final compression, shaping and slicing into individual servings.

Thus, the present invention provides a process for manufacturing a structured meat product comprising the steps of:

(a) separating and removing individual muscles and adjacent muscle groups from wholesale cuts of meat;

(b) removing at least a portion of the connective tissue and fat from the individual muscles and adjacent muscle groups of step (a);

(c) aligning the muscle fibers of the individual muscles and adjacent muscle groups of step (b);

(d) passing the fiber aligned muscles and adjacent muscle groups of step (c) through a plurality of cutting blades;

(e) compressing the cut fiber aligned individual muscles and adjacent muscle groups of step (d), thus shaping and forming the composite of the muscles as desired; and (f) slicing the compressed fiber aligned shaped muscles of step (e) into individual servings or pieces.

In one specific embodiment of the present invention, the reciprocating cutting blades cut the individual muscles and adjacent muscle groups in a direction colinear with the natural fiber alignment, thus controlling the degree of fiber-to-fiber bonding contribution to the texture of the structured meat. In another embodiment of the present invention, the reciprocating cutting blades cut the individual muscles and adjacent muscle groups in a direction perpendicular to the fiber alignment, thus providing a method of controlling the degree of fiber strength contribution to the texture of the structured meat. The present invention further provides for a binder to be added to the individual muscles and adjacent muscle groups during the manufacturing of the structured meat.

It is an object of the present invention to provide a method of manufacturing a structured meat product. it is a further object to provide a structured meat product from a lower quality cut of meat that simulates the texture of the higher quality cut of meat. It is a object of the present invention to provide the structured meat product by aligning the fiber of the individual muscles and muscle groups, thus preserving the fiber-to-fiber bonding. It is a further object of the present invention to provide a method to control the degree of fiber-to-fiber bonding contribution to the texture of the structured meat. It is another object of the present invention to provide a method to control the degree of fiber length contribution to the texture of the structured meat. It is still a further object of the present invention to provide a structured meat product of improved nutritional quality and improved bind. Fulfillment of these objects and the presence and fulfillment of additional objects will be apparent upon complete reading of the specification and claims when taken in conjunction with the attached drawings.

DESCRIPTION OF THE PREFERRED EMBODIMENTS

The method of manufacturing a meat product according to the present invention, how the method differs from prior art methods and the advantages and benefits of the method can perhaps be best explained and understood by reference to the drawings. The method according to the present invention, is intended to take advantage of the naturally occurring fiber alignment within individual muscles and naturally occurring muscle groups. Since there is present within each individual muscle and some muscle groups a longitudinal direction associated with the long fiber direction or orientation, the method of the present invention initially starts by separating and removing the individual muscles and muscle groups from wholesale cuts of meat. By use of the term "wholesale cuts of meat", the present invention is referring to any acceptable larger group of muscles conveniently involved in the butchering trade, including essentially any cut of the carcass or the entire carcass itself. Also, it should be appreciated that in describing and explaining the method according to the present invention, reference will be particularly to wholesale cuts of beef and the corresponding muscles and muscle groups of beef, but the invention is viewed as being applicable generally to other types of meat wherein differences in natural orientation of the fibers from muscle to muscle occurs and as such, the following description of the invention and the invention itself should not be unduly limited.

Figure 2:
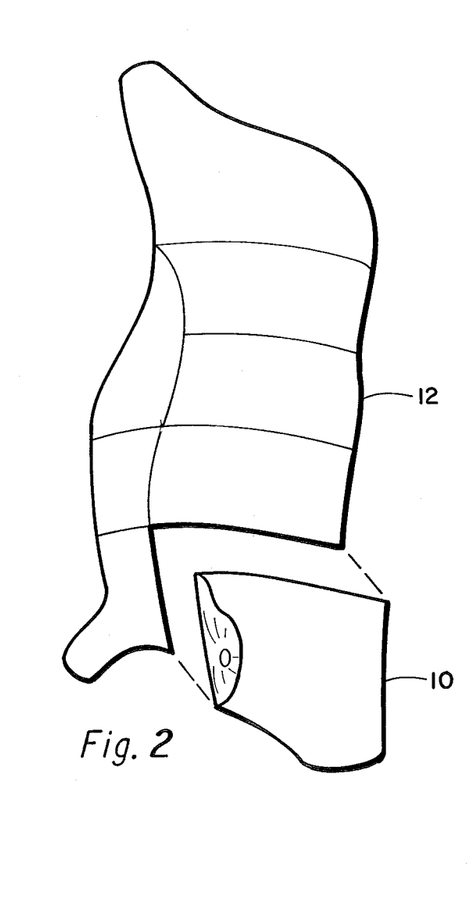
FIG. 2 illustrates the position of the chuck wholesale cut before being removed from a side of beef.
Figure 3:
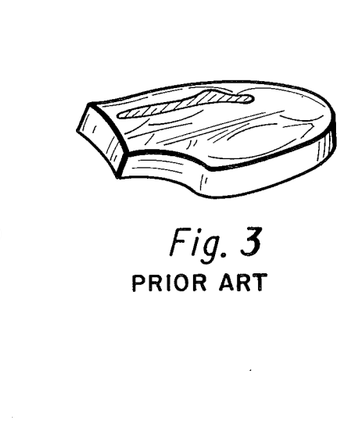
FIG. 3 illustrates the prior art blade roast as cut from the chuck.
Figure 4:
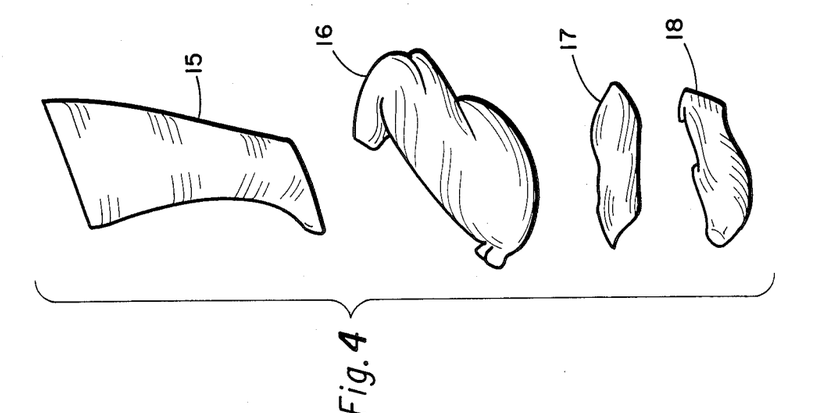
FIG. 4 illustrates the typical muscles and muscle groups as removed from the chuck and positioned with the natural fiber length direction aligned according to the present invention.

As illustrated in FIGS. 2, 3, and 4, the present invention involves the recognition of the direction of the naturally occurring fiber orientation within the muscles and muscle groups of cut of meat. In this specifically illustrated embodiment, the relative position of the wholesale cut referred to as the chuck 10 of a beef carcass 12 is shown in FIG. 2. FIG. 3 shows a conventional blade roast 14 cut from the chuck 10. In contrast to this prior art cut illustrated in FIG. 3, FIG. 4 illustrates some typical boned and denuded muscles and muscle groups removed from the chuck 10 and aligned such that the natural fiber direction (the longitudinal or long direction) of the individual muscle and muscle groups are colinear (i.e., parallel to each other and extending in a common direction), all according to the present invention. More specifically and by way of example, FIG. 3 illustrates the trapezius muscle 15, the complexus/omotransversarius muscle group 16, the spenius muscle 17 and the infraspinatus muscle 18 removed from the chuck, laid out flat and oriented such that the predominant natural fiber directions of each are essentially parallel and horizontal on FIG. 3 (not visibly shown).

It should be appreciated that the present invention is viewed as being generally applicable to all muscles and muscle groups of the chuck as well as other wholesale cuts of beef and other meat sources. The process is viewed as being beneficial even when the predominant natural muscle fiber direction is difficult to orient, such as in the case of the serratus muscle or the like. Also, it should be appreciated that the separating, denuding and removal of connective tissue and fat can be performed at essentially any stage during the processing to the animal carcass including during the hot boning (pre-rigor) or in the alternative after aging or after frozen storage.

At this stage of the overall method according to the present invention, the commonly oriented separate muscles and muscle groups are in principle ready to be cut or sliced, preferably by a plurality of closely spaced cutting blades or the like such as extrusion through a grid of cutting edges. This cutting or slicing of the separated muscles and muscle groups is preferably along the longitudinal direction of the naturally occurring fibers, thus primarily severing the fiber-to-fiber linkage or bonding of the meat tissue without substantially altering the fiber length (i.e., maximum cutting along the natural fiber direction and minimum cutting across the natural fiber direction).

Figure 1:
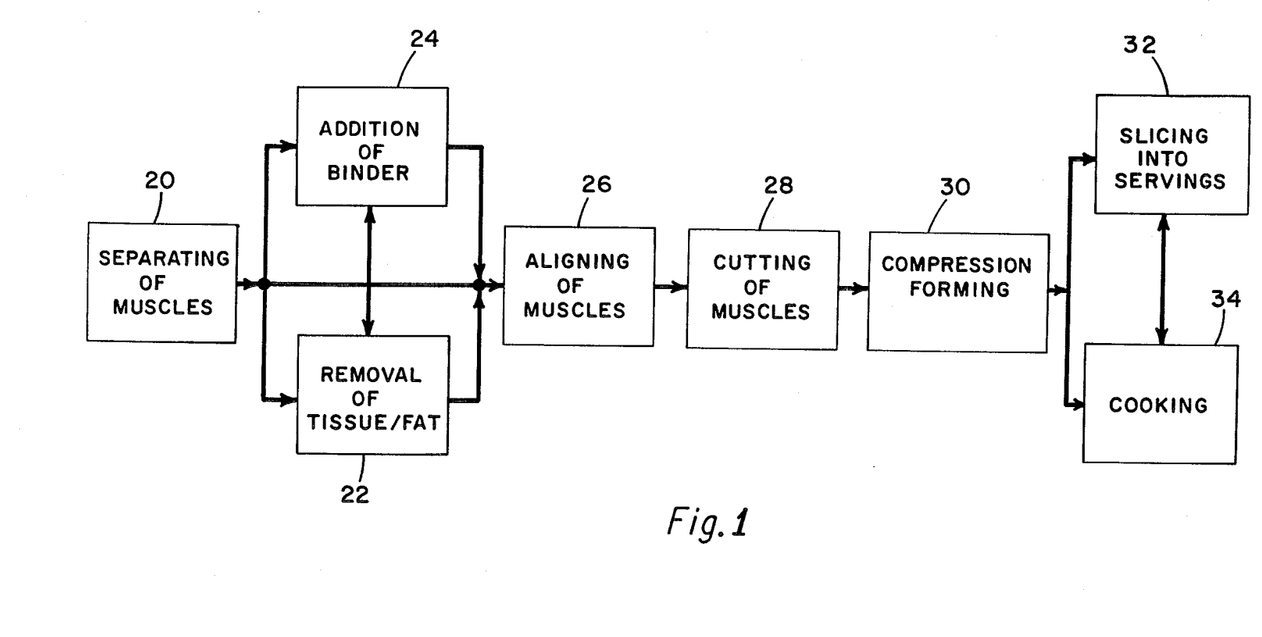
FIG. 1 is a block diagram illustrating the steps of a typical manufacturing process according to the present invention.

However, and as illustrated in the block diagram of FIG. 1, several optional steps can be advantageously employed in the overall progress after separating 20 the wholesale cut into individual muscles and muscle groups and before cutting 28 of the aligned 26 muscles and muscle groups. For example, after separating 20, the individual muscles and muscle groups(15, 16, 17 and 18 of FIG. 3) the deleterious connective tissue such as easily accessible epimysial and perimysial tissue, fat, or even individual less desirable muscles and the like can be advantageously removed 22. Also, the individual muscles and muscle groups can be treated by the addition 24 of binders, preservatives, flavor enhancers, coloring agents and the like either before or after removal of tissue and/or fat. Preferably, the individual muscles and muscle groups separated from the wholesale cut are treated by the addition of a binding agent or binder that enhances the fiber-to-fiber adhesion in the final structured meat product. The presence of a binder has also been found to enhance the integrity and physical stability of the meat product, particularly during handling, storage and cooking, as well as the overall integrity of the cooked product (all as exemplified later).

One particular preferred additive binder system useful in the present invention involves a water solution of chloride salts such as KCl, NaCl, $MgCl_2$, $CaCl_2$ and mixtures thereof in combination with a phosphate salt such as sodium tripolyphosphate, sodium pyrophosphate, trisodium phosphate or the like. One particular preferred binder useful as an additive at this stage of the overall method according to the present invention is a water solution of approximately 0.25 weight percent sodium tripolyphosphate and approximately 0.5 by weight NaCl (again, as exemplified later). Other particularly preferred binder systems useful as additives in the present invention are water solutions of up to about 1.0 molar KCl or NaCl and mixtures thereof in combination with up to about 0.4 molar $MgCl_2$ or $CaCl_2$ and mixtures thereof along with up to about 0.5 weight percent sodium tripolyphosphate, $Na_5P_3O_{10}$. Preferably such solutions are added to the muscles and muscle groups to the extent of about 3% added water relative to the initial weight of meat. However it should be appreciated that concentrations and quantities of additives in excess of these preferred ranges are operative for pusposes of this invention but are not necessarily recommended based on other practical considerations such as product labeling requirements and other governmental regulatory requirement. As such, the scope of the present invention should not be viewed as being unduly limiting. For further details and description of the preferred binders useful in the present invention see U.S. Pat. No. 4,224,349 which is herein incorporated by reference for such purposes.

The actual cutting operation according to the present invention is critical in that the cutting of the aligned muscles and muscle groups longitudinally along the direction of the natural fibers, selectively disrupts the fiber-to-fiber linkage or bonding and as such, the degree to which the fiber-to-fiber linkage contributes to the final texture of the reconstructed meat product is controlled by the cutting action longitudinal to the natural fiber direction. Similarly, the cutting operation according to the present invention is critical in that the cutting of the aligned muscles and muscle groups perpendicular to the direction of the natural fiber direction, selectively disrupts the fiber tensile strength and fiber length. As such, the degree to which fiber tensile strength and fiber length contributes to the texture of the final reconstructed meat product is controlled by the cutting action perpendicular to the natural fiber direction. Consequently, the method according to the present invention affords a technique to control independently the quality and degree of longitudinal fiber-to-fiber contribution as well as fiber length and tensile strength contribution to the final product. In other words, the fiber-to-fiber texture contribution can be selectively altered from a steak-like texture (optimum fiber-to-fiber cutting and minimum or controlled cross fiber cutting) to a ground beef or hamburger type texture (maximum cross fiber cutting). Preferably, an optimum fiber-to-fiber adhesion is achieved by totally severing the muscles and muscle groups longitudinally along the natural fiber length by a plurality of slicings spaced typically from about 1 mm to about 10 mm apart, both longitudinally and vertically, thus producing a plurality of "pseudo-fibers" or meat strands having a cross-sectional area of 1 mm to about 10 mm square. Preferably, the degree of fiber-to-fiber adhesion is then partially restored by the presence of a binding additive (all as described later).

In principle, any cutting or slicing equipment generally known in the art can be employed in the present invention. Preferably, a plurality of closely spaced reciprocating blades (optimumly spaced from about 1 mm to 10 mm apart) are employed. In such case, the muscle is sent through the plurality of reciprocating cutting blades twice with a 90 degree rotation about the natural longitudinal fiber direction of the muscle between passes. In this manner, the two passes through the reciprocating cutting blades creates the desired "pseudo-fiber" or strand of meat along the otherwise natural fiber orientation direction of the muscle.

As further illustrated schematically in FIG. 3, the aligned muscles and muscle groups longitudinally cut into small cross-section strands of meat are then compression molded and shaped 30 into any arbitrary configuration. As such, chuck, round steak, or the like can be readily formed into strip steaks or roast-like shapes simulating a more desirable product and generally commanding a premium price. However, this particular step in the method according to the present invention further provides the additional degree of freedom of molding structured meat products in novel shapes and designs heretofore not achieved by other prior art processes, yet preserves the steaklike qualities and characteristics of the meat. Generally, any compression molding equipment or the like as commercially available in the art is, in principle, compatible with this particular step and as such, useful for purposes of this invention.

The block diagram of FIG. 3 places the process according to the present invention in proper perspective by suggesting that the compression molded reconstructed meat product produced by the method according to the present invention can then be optionally sliced 32 in individual servings or the like before or after being cooked 34 by any culinary method or technique generally known in the art. The following Examples are presented to further illustrate the overall method according to the present invention and the specific applications and associated features along with the advantages and results of employing the present invention.

EXAMPLE I

The bottom round muscle (biceps femoris) from a U.S. choice beef round was removed forty-eight hours post-mortem and stored in a vacuum package for six days at 32° to 36° F. The muscle was then sliced (dorsal to ventral, along the predominant natural direction of the meat fibers)in a Bettcher, Model BH-15, "SLICE-N-TACT" machine equipped with a plurality of reciprocating blades vertically oriented and approximately 2.5 mm apart. After the first pass through the slicing blades, the sliced muscle was rotated 90 degrees about the longitudinal axis (direction of the first cut) of the meat fibers and then sliced a second time in the Bettcher "SLICE-N-TACT" as described above, thus forming (in place) a plurality of essentially 2.5 mm×2.5 mm square cross-sectional strands of sliced meat which traversed the dorsal to ventral length of the muscle and predominantly having the natural fibers longitudinally oriented within the individual strands.

Immediately after slicing into strands, the product was placed in a vacuum bag, hand shaped into a "log" so as not to disturb the fiber alignment or orientation, vacuum packaged, tumbled for twenty minutes, frozen to −20° F., held for twenty-one days, then tempered to 26° F. The tempered log was pressed at approximately 550 psi in a Bettcher press, Model 70, using a strip loin mold to shape the log. The pressed, shaped log was then sliced in a Bettcher power cleaver, Model 39, into approximately 2 cm thick steaks. The steaks were placed on a tray, frozen (−20° F.) for fifteen minutes, vacuum packaged and stored at −10° F.

The frozen steaks were then broiled until they were medium done, using an open faced electric grill (Farberware). The steaks were turned gently, three times during cooking. The raw color of the steak was uniform, but slightly dark red. Some of the steaks did not tend to hold together during broiling, yet those that did, had an excellent external appearance. The internal texture was somewhat like that of intact muscle steaks. In general, the steaks were very fragile during cooking and the individual strands were easily separated from each other by use of a fork during cooking. Taste test showed the steak to be somewhat dry and bland in flavor.

EXAMPLES II THROUGH VI

In a manner analogous to the procedure of Example I, the semimembranosus (top round), semitendinosus (eye of round) and quadriceps (sirloin tip) muscles in a choice round were removed seventy-two hours postmortem and were stored in a vacuum package for six days at 32° to 34° F. Prior to further use, easily removable epimysial connective tissue was removed.

One-half of the semimembranous muscle (representing Example II) was stitch pumped to 105 percent of the green weight with an additional 4.25 percent water, 0.5 precent salt and 0.25 percent sodium tripolyphosphate, and then sliced exactly as described in Example I, except the log was frozen at −20° F. for only four hours before tempering at 26° F.

The other half of the semimembranous muscle (representing Example III) was handled similarly to Example II, except that only one pass was made through the reciprocating slicing machine before being carefully placed into a vacuum bag and hand-shaped into a log.

In a manner analogous to Example II, the entire semitendinosus muscle (representing Example IV) was stitch pumped to 105 percent of the green weight with 4.25 percent water, 0.5 percent NaCl and 0.25 percent sodium tripolyphosphate and then sliced exactly as described in Example I, except the log was frozen at −20° F. for only four hours before tempering at 26° F.

One-half of the quadriceps muscle group (representing Example V) was treated as described in Example II, except that after the first pass through the reciprocating blades, one or two slices of fat approximately 1 mm×40 mm×90 mm were interleafed between every third or fourth muscle slice to simulate marbling.

The other half of the quadriceps muscle group (representing Example VI) was treated as described in Example V, except that only one pass was made through the reciprocating blades.

Prior to cooking, the raw color of the semimembranous muscle of Examples II and III was very undesirable (brown with very dark brown splotches). The raw color of the semitendinosus muscle of Example IV was somewhat undesirable in that the surface displayed occasional brown to very dark areas. The raw color of the quadriceps muscle group of Examples V and VI was excellent. The color was bright red and the 1 mm thick plate slices that were interleafed in the steaks very much resmebled natural marbling.

In a manner analogous to Example I, the individual logs of Examples II through VI were tempered, pressed and cut into steaks. The individual steaks were broiled for all Examples, except some steaks from Example V after being browned on the electric grill were brought to final temperature in a microwave oven.

In Example II, external appearance of the cooked steak was very good. The steak texture resembled that of intact steaks. All steaks held together well on the electric grill, when turning was done gently. Internal fiber orientation resembled that of muscle fiber bundles of intact muscle steaks. Taste test on the cooked steaks gave responses such as "very tender" and "intact steak-like texture". Also, the bind on these steaks was superior to those of Example I. These steaks were still acceptable to taste panelists after six months of frozen storage in vacuum packages.

For Example III, both raw and cooked texture more closely resembled the herringbone effect of fish muscle than it resembled intact beef muscle. Steaks also tended to flake apart between these slices indicating bind was inadquate. Flavor and juiciness was acceptable.

The cooked color and texture of the steaks of Example IV were very good, resembling intact muscle steaks. The bind and texture of these steaks were far superior to that of the steak in Example 1 and superior to those of Examples II and III. This was attributed to the fact that the inherent muscle fibers of this muscle were very easily aligned prior to cutting the 2.5 mm×2.5 mm "quasi-fibers". Sensory evaluation showed these steaks to be uniformly tender and that they closely resembled intact muscle steaks in texture.

After cooking the steaks of Example V, the bind and taste response was similar to that of Example II, except that these steaks were rated as "more juicy". Steaks browned on the electric grill, then micro-waved were also very acceptable, but had a greater amount of drip loss. Steaks micro-waved directly from the frozen steaks had the greatest drip loss.

The cooked steaks of Example VI exhibited attributes resembling those describing the cooked steaks of Example III.

EXAMPLES VII THROUGH XI

A U.S. choice round and two U.S. choice chucks were removed from carcasses and stored 35° F. for five days. At this time, these wholesale cuts were muscle boned and the individual muscles were vacuum packaged and frozen at −20° F. for six days. The muscles were then thawed at 37° F. for twenty-four hours, and the obvious epimysial connective tissue was removed.

The semimembranous muscle and quadriceps muscle group (representing Example VII) were removed and processed identically to Example V, except that after tumbling for twenty minutes, the packaged logs were crust-frozen in a solid $CO_2$ and ethanol slurry (−94° F.) for seven and a half minutes, and then tempered at 26° F. for twenty hours. After tempering, those logs were not firm enough to press so they were subsequently frozen and pressed before being cut into steak as described in Example I.

Steaks made from semimembranosus, quadriceps, biceps femoris, semitendinosus, infraspinatus, supraspinatus and a group of smaller chuck muscles including the spenius, complexus, teres, brachialis, and deep pectoral muscles (representing Example VIII) were prepared as described in Example VII, except after tumbling for twenty minutes, the packaged logs were frozen in a solid $CO_2$ and ethanol slurry (−94° F.) for thirty minutes.

Steaks made from the biceps femoris muscle and triceps brachii muscle (representing Example IX) were prepared as described for Example V.

Steaks made from the infraspinatus and a group of smaller chuck muscles listed in Example VIII (representing Example X) were prepared as described for Example VIII, except the logs were tightly wraped in a vacuum bag which is subsequently overwrapped with oxygen permeable retail wrap prior to tumbling and freezing.

A portion of the semitendinosus muscle (representing Example XI) was handled as described for Example III, except the muscle was passed through the reciprocating blades posterior to anterior (across the grain of the natural fibers) instead of dorsal to ventral (along the grain of the natural fibers).

Raw color of the steaks on all of the Examples was undesirable with color within any one steak ranging from bright cherry red to dark red, to brown to very dark areas. In addition, most of the cryofrozen logs from which the above steaks were cut had soft unfrozen spots in the middle.

Because salt and salt impurities are known to promote oxidative rancidity and metmyoglobin (oxidized brown color) formation, several of the steaks from the above examples were color mapped and measured for salt concentration in various color areas. Salt concentrations were clearly highest in those areas that wre brown or black, indicating that with the stitch pumping method, the distribution of salt, phosphate and water was not uniform. However, all steaks were very acceptable in the cooked state. These cooked products were taste tested by a consumer panel of approximately three hundred persons and comments by the taste testers were almost unanimously favorable, including such mcomments "great", "excellent flavor", "tender" and "steak-like texture". Trained panelists preferred steaks made from chuck muscles over round muscles, as they were more juicy and flavorful. Raw steaks made from the infraspinatus muscle had a seam of connective tissue running through the center of each steak, but upon broiling, the steaks were tender even in the vicinity of the seam of connective tissue. The steaks from Example XI did not obtain adequate binding and as such, the individual 2.5 mm slices tended to separate from one another upon cooking. These steaks were also noticeably tougher than those from previous Examples (I, II, IV, V, VII-X) and had less desirable texture.

EXAMPLES XII THROUGH XIX

A U.S. choice chuck was muscle boned twenty-four hours post-mortem. Easily removable connective tissue was trimmed and the muscles were used immediately.

Steaks (representing Example XII) were prepared from supraspinatus and infraspinatus muscles, triceps muscles and from a mixture of deep pectoral, latissimus dorsi, trapezius, rhomboideus and superficial pectoral muscles. steaks were prepared as in Example VIII, except fresh meat was used and the logs were cryofrozen in solid $CO_2$ and ethanol for forty minutes, instead of thirty minutes.

Steaks made from serratus muscle and a combination of small chuck muscles (representing Example XIII) were prepared as described in Example II, except the log was crust-frozen in solid $CO_2$ and ethanol for ten minutes prior to being blast frozen (−20° F.) for four hours.

Steaks made from a combination of small chuck muscles (representing Example XIV) were prepared using the crust-freezing method described in Example VII, except the logs were crust-frozen for ten minutes instead of 7.5 minutes prior to tempering at 26° F.

Steaks made from a combination of small chuck muscles (representing Example XV) were prepared as described for Example II.

Steaks (representing Examples XVI through XIX) were prepared identically to the steaks of Examples XII through XV, respectively, except after the steaks were sliced, they were allowed to "bloom" for thirty minutes, on trays, in a 47° F. room prior to blast freezing (−20° F.) for fifteen minutes and vacuum packaging.

The raw appearance of all steaks was generally quite good, varying from red to purplish red. Cryofreezing had no advantage over conventional blast freezing and even forty minutes of cryofreezing was an inadequate amount of time to prevent a small soft post in the middle of the log. As with the previous Examples, when steaks were handled gently during early stages of cooking, they held together well and after cooking, steaks held together quite well; but extremely rough handling would cause separation of some parts of the steaks. Subjective response to cooked steaks was excellent (similar to the responss to Examples VII through X). Steaks prepared from infraspinatus and supraspinatus muscles were preferred by some experienced meat scientists. Vacuum packaged steaks kept frozen at −20° F. for at least six months still exhibited excellent palatability and raw color characteristics. The steaks of Examples XVI through XIX exhibited very similar characteristics to the steaks of Examples XII through XV, except that the thirty minute "blooming" caused the raw color to be slight brighter (more cherry red).

EXAMPLES XX THROUGH XXIII

Semimembranosus, biceps femoris and quadriceps muscles were removed from a U.S. choice round seventy-two hours post-mortem. The muscles were wrapped in polyvinyl chloride film and stored in a tempering box at 26° F. overnight prior to use. Only tendonous tissue was removed and the epimysial connective tissue was not removed.

The semimembranosus muscle (representing Example XX) was stitch pumped as described for Example II. The muscle was then sliced, dorsal to ventral, into one-half inch thick slices. These slices were mixed to twelve minutes in a Leland mixer in a cooler at 32° F. and then randomly and en masse passed through the reciprocating blades. This product was rotated 90 degrees and passed through the reciprocating blades a second time. Resulting product was then handled as described in Example X, except that the log was not tumbled and freezing was accomplished conventionally in a blast freezer instead of cryogenically in solid $CO_2$ and ethanol.

The biceps femoris muscles, without stitch pumping, were passed once (dorsal to vertral) through the reciprocating blades producing 2.5 mm slices. These slices were then mixed with 4.25 percent water, 0.5 percent sodium chloride and 0.25 percent sodium tripolyphosphate (be weight) in a Leland mixer for twelve minutes. After removal from the mixer, the product was handled in a manner identical to Example XX.

One-half of the quadriceps muscle was stitch pumped as described in Example II and then mixed for twelve minutes. The muscle was then passed (dorsal to ventral) through the reciprocating blades twice as described in Example I. The product was then handled in a manner identical to Example XX. The other half of the quadriceps muscle was handled identically to Example XXII, except that the log was tumbled for thirty minutes prior to freezing.

All steaks after passing and slicing had excellent raw color, held together very well on the grill and could be cut with a steak knife without falling apart. The steaks of Example XXI were very attractive on the plate, but fiber orientation was not well defined in comparison to previous Examples (I, II, IV, V, VII-IX, XII-XX, XXII and XXIII) and upon eating were reminiscent of the texture of hamburger. The steaks of Example XX had very similar attributes, but upon eating, were more like intact muscle steaks. Some steaks from Example XXII exhibited some minor deformation on the grill, but bind was very good and fiber orientation in those steaks that were not deformed was very good. Tumbling gave the steaks of Example XXIII no advantage over the steaks of Example XXII.

EXAMPLES XXIV AND XXV

Both semitendinosus muscles were removed from a beef carcass eight days post-mortem. External fat was trimmed, but epimysial connective tissue was not removed.

One semitendinosus muscle (representing Example XXIV) was prepared as described in Example II.

The other semitendinosus muscle (representing Example XXV) was prepared as described for Example II, except the muscle was passed through the reciprocating slicing machine twice so that the fibers ran across the natural grain (anterior to posterior) of the muscle instead of with the grain (dorsal to ventral). The product was also placed in the bags so that the "fibers" ran perpendicular to the length of the log.

After pressing and slicing into steaks, the steaks of Example XXIV had excellent raw and cooked appearance. Bind was acceptable, but the steaks required gentle treatment on the grill. Palatability was excellent and fiber orientation and distinction were very natural. The steaks prepared from Example XXV exhibited superior bind to the steaks of Example XXIV, but the steaks looked like a natural steak that had been incorrectly cut with the grain instead of across the grain. This fiber structure was not as attractive as that of Example XXIV and there was some deformation of the cooked steak. Fieldometer peak height was over twice as high as for Example XXIV, indicating that steaks from Example XXV were much tougher and lacked the natural texture of steaks from Example XXIV.

EXAMPLE XXVI

A U.S. choice grade chuck was boned fourteen days post-mortem. Muscles were taken out in large groups and only easily removable tendon and intramuscular fat were removed. The muscle groups were sliced into one-half inch slices. Slices were mixed in a Leland mixer for fifteen minutes at 32° F. with 4.25 percent water, 0.5 percent salt and 0.25 percent sodium tripolyphosphate. After this mixing step, the product was handled identically to that described in Example XX.

After pressing and slicing, the raw color of the steaks, even though well aged product was used, was very good. Bind on these steaks was also very good as little extra care was required during grilling. Flavor and texture of the cooked steaks were similar to Example XX.

EXAMPLE XXVII

A U.S. choice chuck was de-fatted (subcutaneous fat), then boned into individual muscles from which the intermuscular fat and epimysial connective tissue was selectively removed. The "denuded" muscles were placed in a blast freezer ($-20°$ to $-30°$ F.) for 30 minutes, then removed to a 26° F. tempering freezer for approximately 18 hours where the internal temperature of the muscles was brought to approximately 26°–29° F. The muscles were then placed into a Globus VMS 37-526 massager-tumbler. A binder, consisting of 3% water, 0.5% NaCl, and 0.25% sodium tripolyphosphate, by weight of total muscle, was added. A vacuum, approximately 86% of an atmosphere, was drawn and the machine allowed to run for 30 minutes at 30°–34° F. The muscles were then placed in a Slice-N-Tact machine (previously described) and aligned so that the predominant direction of the native muscle fibers was parallel to each other. The mass was then passed through a plurality of vertically reciprocating blades, spaced about 2.5 mm apart. The resulting muscle block was divided into three easily manageable portions taking care to maintain the longitudinal cut fiber orientation; each portion was rotated 90° with respect to its long axis and passed through the machine a second time, producing quasimuscle fibers approximately 2 to 2.5 mm square and of varying length. The resulting muscle "logs" were placed into plastic bags, overwrapped with a film (Goodyear Prime Wrap II) so that the quasi-muscle fibers were undisturbed, blast frozen ($-20°$ to $-30°$ F.) for 3 hrs., then placed in the 26° F. tempering freezer for about 18 hrs., where the internal temperature was brought to approximately 26° to 28° F. The muscle logs were then pressed in a Bettcher Model 70 press at about 550 p.s.i. into the shape of a strip loin. The pressed logs were then sliced into steaks, approximately 2 cm thick, in a Bettcher Model 39 power cleaver. Slicing was perpendicular to the long axis of the quasi-fibers. The steaks were placed in a $-20°$ F. freezer for 10 min., then vacuum packaged and held at $-5°$ F. to $-10°$ F. until evaluated by a trained panel. For taste testing, the steaks were removed from the freezer, placed directly on a Farberware electric grill and cooked at high temperature for approximately 25 minutes, turning once during cooking. Panelists scored raw steak color as cherry, red, bind and texture as acceptable and tenderness as excellent. Flavor and juiciness were rated as very acceptable.

EXAMPLE XXVIII

Another test was run identical to that outlined in Example XXVII except that the binder consisted of 3% water, 0.5% NaCl and 0.375% sodium tripolyphosphate. Results showed that the additional phosphate in the binder improved panel ratings for bind and texture, while the other sensory evaluations were about the same as those for example XXVII.

EXAMPLE XXIX

In another test, run as outlined in Example XXVII, the binder was formulated as follows: 3% water, by weight of total muscle; 1.0M KCl (molarity based on the total added water); 0.4M $MgCl_2 \cdot 6H_2O$, (molarity based on the total added water) and 0.25% sodium tripolyphosphate (by weight of total muscle). Results of this test showed that when the NaCl (Example XXVII) was replaced with KCl and $MgCl_2 \cdot 6H_2O$, the ratings for raw color as well as bind and texture were superior to those of Example XXVIII. Tenderness, flavor and juiciness were still rated as excellent and very acceptable, respectively.

EXAMPLE XXX

In still another test, run as outlined in Example XXVII the binder described in Example XXIX was used, except that the phosphate was increased to 0.375% (by weight of total muscle). Results were the same as found in Example XXIX except that the increased phosphate improved panel evaluations for bind and texture.

EXAMPLE XXXI

In another test run as outlined in Example XXVII, the binder described in Example XXIX was used except that the phosphate was increased to 0.475% (by weight of total muscle). Results were about the same as for Example XXX, with the added phosphate only slightly improving bind but having no appreciable effect on texture.

EXAMPLE XXXII

In another test run as outlined in Example XXVII, the binder described in Example XXX was used except that the 0.4M $MgCl_2 \cdot 6H_2O$ was reduced to 0.1 M $MgCl_2 \cdot 6H_2O$ (molarity based on total added water). Results were similar to those from Example XXX except that the bind was less desirable.

EXAMPLE XXXIII

In another test run as outlined in Example XXVII, the binder described in Example XXXI was used except that the 0.4M $MgCl_2 \cdot 6H_2O$ was reduced to 0.1M $MgCl_2 \cdot 6H_2O$ as in Example XXXII. Results showed that the higher level of phosphate, as compared to Example XXXII, had only a slight positive effect on bind. Other sensory characteristics, however, were very acceptable.

EXAMPlE XXXIV

In another test run as outlined in Example XXXVII, the binder described in Example XXX was used except that the 1.0M KCl was reduced to 0.6M KCl. Results were very similar to those obtained for Example XXX.

EXAMPLE XXXV

In another test run as outlined in Example XXVII, the binder described in Example XXXIV was used except that the phosphate level was increased from 0.375% to 0.475% (by weight of total muscle). The added phosphate produced a slightly better bind than that observed in Example XXXIV.

EXAMPLE XXXVI

In another test run as outlined in Example XXVII, the binder described in Example XXXIV was used except that the 0.4M $MgCl_2 \cdot 6H_2O$ was reduced to 0.1M $MgCl_2 \cdot 6H_2O$. Again, as observed in Example XXXII, lowering the $MgCl_2$ concentration also lowered the bind desirability.

EXAMPLE XXXVII

In another test run as outlined in Example XXVII, the binder described in Example XXXVI was used, except that the phosphate level was raised from 0.375% to 0.475%. Only very small increases in bind and other sensory characteristics were noted when compared to Example XXXVI.

EXAMPLE XXXVIII

In another test run as outlined in Example XXVII, the binder described in Example XXXVII was used except that the 0.1M $MgCl_2 \cdot H_2O$ was increased to 0.2M $MgCl_2 \cdot 6H_2O$. Results showed that this increase in $MgCl_2$ favorably affected bind and other sensory characteristics observed in Example XXXVII.

EXAMPLE XXXIX

In another test run as outlined in Example XXVII, the binder described in Example XXXVIII was used except that the 0.2M $MgCl_2 \cdot 6H_2O$ was replaced with 0.2M $CaCl_2$ (molarity based on total added water). The bind and sensory results obtained were about the same as those obtained in Example XXXVIII.

EXAMPLE XL

In another test run as outlined in Example XXVII, the binder described in Example XXXIX was used except that the 0.2M $CaCl_2$ was increased to 0.4M $CaCl_2$. Results obtained were similar to those of Example XXXV. These steaks, however, tended to be a little drier and more brittle than those from Example XXXV. Nevertheless, the raw color, bind and tenderness of the cooked steaks were very acceptable.

EXAMPLE XLI

In a series of separate tests run as outlined in Example XXVII and using the binder described in Example XXXV, the muscles were massaged-tumbled in the Globus VMS 37-526 for 10, 30, 60 and 90 minutes. Results showed that when the massaging-tumbling time was decreased to 10 minutes, there was a decrease in the bind and texture of the cooked steaks, whereas increasing the time to 60 minutes produced a slightly better bind and texture than that observed with the steaks from muscles massaged-tumbled for 30 minutes. Increasing the massaging-tumbling time from 60 to 90 minutes produced no additional beneficial effects on bind or texture of cooked steaks.

EXAMPLE XLII

Another test was run as outlined in Example XXVII, except for the one variation stated below, using the binder described in Example XXXV. After massaging-tumbling the muscles were placed in the Slice-N-Tact machine in a manner that would cause them to be cut perpendicular to or across the predominant direction of the native muscle fibers (on both passes through the reciprocation blades). The remaining production steps were the same as those described in Example XXVII. Results showed that both the raw and cooked steaks had a very poor bind and an especially poor textural appearance. Moreover, the cooked steaks were rated as "hamburger-like" in bite characteristics by trained taste panelists.

EXAMPLE XLIII

In another test, structured steaks were manufactured as outlined in Example XXVII, using the binder described in Example XXX. These steaks were compared, via a trained taste panel, to inctact muscle ribeye steaks sliced to the same thickness (2 cm) as the structured steaks. The panel evaluated the steaks on tenderness, connective tissue residue, flavor and juiciness, using an eight point hedonic scale with 8 as optimum and 1 as minimum for each characteristic. Results showed that the structured steaks 1) were significantly ($P<0.05$) more tender than the intact muscle ribeye steaks (6.72 vs 5.71);2) had significantly ($P<0.05$) less connective tissue residue than the ribeye steaks (7.24 vs 6.46);3) were about the same ($P>0.05$)in flavor (5.33 vs 5.48) and ($P>0.05$) juiciness (5.15 vs 5.31) as the intact muscle ribeye steaks.

The advantages and benefits of the present invention relative to the prior art methods of structuring meat are considered numerous and significant. First and foremost, the present invention, by virtue of selectively controlling the degree of slicing longitudinal to the natural fiber direction of the muscle separate from the degree of slicing perpendicular to the natural fiber direction affords an opportunity to control the degree of contribution of fiber-to-fiber adhesion or binding to the texture of the final meat product separate and apart from the degree on contribution of fiber length to the texture of the final meat product. This in turn results in improved meat texture particularly in that the lower quality cuts of meat can be structured according to the present invention to achieve texture reminiscent of the more expensive cuts of meat. The present invention also affords the control of the fiber-to-fiber adhesion after intentional slicing by the addition of binders and binding solutions. This in turn results in improved meat integrity during storing, handling, cooking and serving of the structured meat product.

The method according to the present invention has been successful used to produce a variety of structured meat products including by way of example but not limited to steaks, breaded cutlets, roasts, K-bobs, nuggets, sandwich steaks, finger steaks, breakfast steaks, patty steaks, stir fried steaks and teriyaki steaks. The method has been particularly useful in controlling or more specifically preserving the bind or strength in a preferred direction of a structured meat product such as necessary for K-bob and finger or teriyaki steaks or the like.

The present invention is further viewed as providing for a relatively inexpensive method, amenable to contemporary mass production, for structuring meat products that simulate both popular multiple serving cuts (i.e., roasts and the like) as well as individual serving cuts (i.e., steaks and the like), yet further provides the added dimension of allowing for all new or unique shapes of meat servings that are still steak-like in quality. Thus, the present invention provides a method for manufacturing a steak-like sausage, weiner, or patty as well as arbitrarily any other novel shape. Since the process of the present invention provides for separation of the individual muscles and muscle groups, the quality of the final product can also be controlled and improved by virture of affording the opportunity to remove deleterious connecting tissue, fat and even less desirable muscles. Hence, the present invention is viewed as having a distinct advantage over the prior art methods in that the quality of the meat going to the final product can be readily controlled.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:

1. A process for manufacturing a structured meat product comprising the steps of:
   (a) separating and removing individual muscles and adjacent muscle groups from wholesale cuts of meat;
   (b) removing at least a portion of the connective tissue from said individual muscles and adjacent muscle groups of step (a);
   (c) aligning the muscle fiber of the individual muscles and adjacent muscle groups of step (b) such that the muscle fiber direction of the individual muscles and adjacent muscle groups are essentially parallel to each other and extend in a longitudinal direction;
   (d) passing the fiber aligned muscles and adjacent muscle groups of step (c) through a plurality of cutting blades;
   (e) compressing the cut fiber aligned individual muscles and adjacent muscle groups of step (d), thus shaping and forming the composite of the muscles as desired; and
   (g) slicing the compressed fiber aligned shaped muscles of step (e) into individual servings or pieces.

2. A process of claim 1 wherein the reciprocating cutting blades of step (d) cut the individual muscles and adjacent muscle groups in a direction colinear with the fiber alignment.

3. A process of claim 2 further comprising the step of adding a binder to the individual muscles and adjacent muscle groups.

4. A process of claim 3 wherein the binder is a water solution of approximately 0.5 percent NaCl and 0.5 percent $Na_5P_3O_{10}$ and the addition of the binder into the muscle is performed before the passing of the fiber aligned muscle and adjacent muscle groups through a plurality of reciprocating cutting blades.

5. A process of claim 2 wherein the reciprocating blades are spaced from about 1 mm apart to about 10 mm apart.

6. In a process for manufacturing a structured meat product, the specific improvement comprising the steps of:
   (a) separating and removing individual muscles and adjacent muscle groups of similar fiber alignment from wholesale cuts of meat;
   (b) aligning the muscle fiber of the individual muscles and adjacent muscle groups of step (a) such that the muscle fiber direction of the individual muscles and adjacent muscle groups are essentially parallel to each other and extend in a longitudinal direction; and
   (c) cutting the fiber aligned muscles and adjacent muscle groups of step (b) with a plurality of closely spaced cutting blades.

7. In a process of claim 6 wherein the cutting of the fiber aligned muscle and adjacent muscle groups with a plurality of closely spaced cutting blades is performed such that the cutting is substantially colinear to the longitudinal direction of the aligned muscle fibers.

8. In a process of claim 7 further comprising the step of cutting the fiber aligned muscles and adjacent muscle groups a second time with a plurality of closely spaced cutting blades such that the cutting is substantially colinear to the longitudinal direction of the aligned muscle fibers and substantially perpendicular to the previous cutting.

9. In a process of claim 6 further comprising the step of adding a binder to the individual muscles and adjacent muscle groups.

10. In a process of claim 9 wherein the cutting of the fiber aligned muscle and adjacent muscle groups with a plurality of closely spaced cutting blades is performed such that the cutting is substantially colinear to the longitudinal direction of the aligned muscle fibers.

11. In a process of claim 10 further comprising the step of cutting the fiber aligned muscles and adjacent muscle groups a second time with a plurality of closely spaced cutting blades such that the cutting is substantially colinear to the longitudinal direction of the aligned muscle fibers and substantially perpendicular to the previous cutting.

12. In a process of claim 11 wherein the binder is a water solution of approximately 0.5 percent NaCl and 0.5 percent $Na_5P_3O_{10}$ and the addition of the binder into the muscle is performed before the passing of the fiber aligned muscle and adjacent muscle groups through a plurality of reciprocating cutting blades.

13. In a process of claim 12 wherein the reciprocating blades are spaced from about 1 mm apart to about 10 mm apart.

14. In a process for manufacturing a structured meat product, the specific improvement comprising the steps of:
   (a) separating and removing individual muscles and adjacent muscle groups of similar fiber alignment from wholesale cuts of meat;
   (b) removing at least a portion of the connective tissue from said individual muscles and adjacent muscle groups of step (a);
   (C) aligning the muscle fiber of the individual muscles and adjacent muscle groups of step (b) such that the muscle fiber direction of the individual muscles and adjacent muscle groups are essentially parallel to each other and extend in a longitudinal direction; and
   (d) passing the fiber aligned muscles and adjacent muscle groups of step (c) through a plurality of closely spaced cutting blades.

15. In a process of claim 14 wherein the cutting of the fiber aligned muscle and adjacent muscle groups with a plurality of closely spaced cutting blades is performed such that the cutting is substantially colinear to the longitudinal direction of the aligned muscle fibers.

16. In a process of claim 15 further comprising the step of cutting the fiber aligned muscles and adjacent muscle groups a second time with a plurality of closely spaced cutting blades such that the cutting is substantially colinear to the longitudinal direction of the aligned muscle fibers and substantially perpendicular to the previous cutting.

17. In a process of claim 14 further comprising the step of adding a binder to the individual muscles and adjacent muscle groups.

18. In a process of claim 17 wherein the cutting of the fiber aligned muscle and adjacent muscle groups with a plurality of closely spaced cutting blades is performed such that the cutting is substantially colinear to the longitudinal direction of the aligned muscle fibers.

19. In the process of claim 18 further comprising the step of cutting the fiber aligned muscles and adjacent muscle groups a second time with a plurality of closely spaced cutting blades such that the cutting is substantially colinear to the longitudinal direction of the aligned muscle fibers and substantially perpendicular to the previous cutting.

20. In a process of claim 19 wherein the binder is a water solution of approximately 0.5 percent NaCl and 0.5 percent $Na_5P_3O_{10}$ and the addition of the binder into the muscle is performed before the passing of the fiber aligned muscle and adjacent muscle groups through a plurality of reciprocating cutting blades.

21. In a process of claim 20 wherein the reciprocating blades are spaced from about 1 mm apart to about 10 mm apart.

22. A process of claim 3, wherein the binder is a water solution of up to about 1.0 molar KCl and up to about 0.4 molar of a salt selected from the group consisting of $MgCl_2$, $CaCl_2$ and mixtures thereof and up to about 0.5 weight percent $Na_5P_3O_{10}$.

23. A process of claim 19 wherein the binder is a water solution of up to about 1.0 molar KCl and up to about 0.4 molar of a salt selected from the group consisting of $MgCl_2$, $CaCl_2$ and mixtures thereof and up to about 0.5 weight percent $Na_5P_3O_{10}$.

* * * * *